(12) United States Patent
Vandewinckel et al.

(10) Patent No.: US 12,173,191 B2
(45) Date of Patent: Dec. 24, 2024

(54) BODY PAINT USING TONER PARTICLES

(71) Applicant: Xerox Corporation, Norwalk, CT (US)

(72) Inventors: Judith Millner Vandewinckel, Livonia, NY (US); Eliud Robles Flores, Rochester, NY (US); Yu Qi, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 847 days.

(21) Appl. No.: 17/086,526

(22) Filed: Nov. 2, 2020

(65) Prior Publication Data

US 2022/0135813 A1    May 5, 2022

(51) Int. Cl.
| | |
|---|---|
| *G03G 9/093* | (2006.01) |
| *C09D 7/40* | (2018.01) |
| *C09D 7/62* | (2018.01) |
| *G03G 9/09* | (2006.01) |
| *G03G 9/125* | (2006.01) |

(52) U.S. Cl.
CPC .............. *C09D 7/62* (2018.01); *C09D 7/67* (2018.01); *C09D 7/68* (2018.01); *G03G 9/0902* (2013.01); *G03G 9/0904* (2013.01); *G03G 9/09328* (2013.01); *G03G 9/125* (2013.01)

(58) Field of Classification Search
CPC ................. G03G 9/125; G03G 9/13
See application file for complete search history.

(56) References Cited

U.S. PATENT DOCUMENTS

| 7,556,907 B2 * | 7/2009 | Teshima | G03G 9/1355 |
| | | | 430/117.1 |
| 2006/0194138 A1 * | 8/2006 | Regev | G03G 9/135 |
| | | | 430/114 |
| 2009/0260749 A1 * | 10/2009 | Ankamafio-Adjei | |
| | | | B44C 1/1741 |
| | | | 156/349 |
| 2013/0302733 A1 * | 11/2013 | Chun | G03G 9/0804 |
| | | | 430/114 |

FOREIGN PATENT DOCUMENTS

| JP | 2006-206897 | * | 8/2006 | ............... C08J 3/12 |
| JP | 2018-205484 | * | 12/2018 | ............... G03G 9/13 |

OTHER PUBLICATIONS

Translation of JP 2006-206897.*
Translation of JP 2018-205484.*

* cited by examiner

*Primary Examiner* — Peter L Vajda
(74) *Attorney, Agent, or Firm* — MH2 Technology Law Group LLP

(57) ABSTRACT

Disclosed is a washable non-toxic body paint including core/shell toner particles having a size of from 4.0 µm to 30 µm, wherein the core comprises a colorant and the shell comprises a polyester resin. The body paint includes an alcohol-free medium of gelatin or glycerin. The body paint can be applied to a skin surface.

20 Claims, No Drawings

BODY PAINT USING TONER PARTICLES

BACKGROUND

Field of Use

The present disclosure relates, in various embodiments, to alcohol-free body paints.

Background

Body painting is used in technology environments to teach anatomy in universities. Body paint is used to promote products for marketing campaigns. Body painted models are used for advertising signs, posters, and commercials. Body painting is used in movies plays, Art performances, festivals, fine arts, face painting, body art, black light art, as well as used by football and baseball players under their eyes, and fans attending sporting events. Hunters and military personnel use body paint for camouflage paint on their faces.

The problem with body paints on the market is that most are water active and need to be rubbed on the skin. Some body paints are also alcohol based and not easy to be removed, they are costly and some crack and drip over time and may be uneven when placed on the skin. They also bleed into the colors with a need to use hair spray to fix the color on the skin when multiple colors are used together or applied over each other on the body. It would be desirable to provide a body paint that solves these critical issues.

SUMMARY

According to various embodiments, there is disclosed a washable non-toxic body paint including core/shell toner particles having a size of from 4.0 μm to 30 μm, wherein the core comprises a colorant and the shell comprises a polyester resin. The body paint includes an alcohol-free medium of gelatin or glycerin.

A further aspect described herein is a method for applying washable non-toxic body paint to a skin surface. The method includes providing body paint of core/shell toner particles having a size of from 4.0 μm to 30 μm, wherein the core comprises a colorant and the shell comprises a polyester resin and an alcohol free medium. The method includes applying the body paint to a surface of the skin.

A further aspect described herein is a washable non-toxic body paint. The washable non-toxic body paint includes core/shell toner particles having a size of from 4.0 μm to 30 μm, wherein the core comprises a colorant and the shell comprises a polyester resin. The washable non-toxic body paint includes an alcohol free medium, wherein a weight percent of the alcohol-free medium is from 10 to 80 of the body paint.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary and non-limiting.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein are the use of emulsion aggregation (EA) toner particles to create products that can be used for body paint. The washable non-toxic body paint includes core/shell toner particles having a size of from 4.0 μm to 10 μm, wherein the core comprises a colorant and the shell comprises a polyester resin. The body paint includes an alcohol free medium of gelatin or glycerin.

Toner Particles

The core/shell toner particles herein comprise a combination of lower molecular weight unbranched amorphous polyester, higher molecular weight branched amorphous polyester, crystalline polyester, a colorant, and optionally a wax.

The toner of the present disclosure is an emulsion aggregation (EA) toner having toner particles including a colorant. The EA toner can be prepared by a conventional emulsion aggregation process or by a batch aggregation/continuous coalescence process or by a continuous aggregation/coalescence emulsion aggregation process. In embodiments, the toner of the present disclosure is a dry powder. The term "dry powder" as used herein refers to a composition that contains finely dispersed dry toner particles. Such a dry powder or dry particle may contain up to about 5%, up to about 2%, up to about 1%, or up to about 0.1% water or other solvent, or be substantially free of water or other solvent, or be anhydrous. In embodiments, the toner of the present disclosure contains a core and a shell.

The toner composition of the present disclosure includes a polyester resin. The polyester resin may be crystalline, amorphous or mixtures thereof. Suitable polyester resins include, for example, crystalline, amorphous, mixtures thereof, and the like. The polyester resins may be linear, branched, mixtures thereof, and the like. Polyester resins may include, in embodiments, those resins described in U.S. Pat. Nos. 6,593,049 and 6,756,176, the disclosure of each of which hereby is incorporated by reference in entirety. Suitable resins include a mixture of an amorphous polyester resin and a crystalline polyester resin as described in U.S. Pat. No. 6,830,860, the disclosure of which is hereby incorporated by reference in entirety.

Crystalline Resins

In embodiments, the crystalline resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, or 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, or mixtures thereof, and the like. The aliphatic diol may be, for example, selected in an amount of from about 40 to about 60 mole % (although amounts outside of those ranges may be used).

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, or a diester or anhydride thereof. The organic diacid may be selected in an amount of, for example, in embodiments, from about 40 to about 60 mole %.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, or mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(hexane-dodecanoate), poly(nonylene-sebacate), poly(nonylene-decanoate), poly(nonane-dodecanoate) (available from Kao corporation), copoly(ethylene-fumarate)-copoly(ethylene-sebacate), copoly(ethylene-fumarate)-copoly(ethylene-decanoate), or copoly(ethylene-fumarate)-copoly(ethylene-dodecanoate) and so on. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), or mixtures thereof.

Suitable crystalline resins include those disclosed in U.S. Publ. No. 2006/0222991, the disclosure of which is hereby incorporated by reference in entirety. In embodiments, a suitable crystalline resin may be composed of ethylene glycol and a mixture of dodecanedioic acid and fumaric acid co-monomers.

The crystalline resin may possess various melting points of, for example, from about 30° C. to about 120° C., in embodiments, from about 50° C. to about 90° C. The crystalline resin may have a number average molecular weight (Mn) as measured by gel permeation chromatography (GPC) of, for example, from about 1,000 to about 50,000, in embodiments, from about 2,000 to about 25,000, and a weight average molecular weight (Mw) of, for example, from about 2,000 to about 100,000, in embodiments, from about 3,000 to about 80,000, as determined by GPC. The molecular weight distribution (Mw/Mn) of the crystalline resin may be, for example, from about 2 to about 6, in embodiments, from about 3 to about 4. The crystalline polyester resins may have an acid value of less than about 1 meq KOH/g, from about 0.5 to about 0.65 meq KOH/g, in embodiments, from about 0.65 to about 0.75 meq KOH/g, from about 0.75 to about 0.8 meq KOH/g.

The crystalline polyester resin may be presented in an amount of from about 1 weight percent to 25 weight percent, from about 3 weight percent to 20 weight percent, from about 5 weight percent to 15 weight percent by weight of the toner.

Amorphous Resins

Examples of diacid or diesters selected for the preparation of amorphous polyesters include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester is selected, for example, from about 45 to about 52 mole % of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, 1,2-ethanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols, such as, sodio 2-sulfa-1,2-ethanediol, lithio 2-sulfa-1,2-ethanediol, potassio 2-sulfa-1,2-ethanediol, sodio 2-sulfa-1,3-propanediol, lithio 2-sulfo-1,3-propanediol, potassio 2-sulfa-1,3-propanediol, mixtures thereof, and the like, or mixtures thereof. The amount of organic diol selected may vary, and more specifically, is, for example, from about 45 to about 52 mole % of the resin.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfa-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanedial, 2-sulfo-hexanediol, 3-sulfo-2-methylpentanediol, N,N-bis(2-hydroxyethyl)-2-aminoethane sulfonate, 2-sulfa-3,3-dimethylpent-anediol, sulfa-p-hydroxybenzoic acid, or mixtures thereto, and the like. Effective difunctional monomer amounts of, for example, from about 0.1 to about 2 wt % of the resin may be selected.

Exemplary amorphous polyester resins include, but are not limited to, propoxylated bisphenol A fumarate resin, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), a copoly(propoxylated bisphenol A co-fumarate)-copoly (propoxylated bisphenol A co-terephthalate), a terpoly (propoxylated bisphenol A co-fumarate)-terpoly(propoxylated bisphenol A co-terephthalate)-terpoly-(propoxylated bisphenol A co-dodecylsuccinate), or mixtures thereof.

In embodiments, a suitable amorphous polyester resin may be a poly(propoxylated bisphenol A co-fumarate).

In embodiments, the amorphous polyester resin may be obtained from Kao corporation as [poly(co-propoxylated bisphenol A co-ethoxylated bisphenol A co-terephthalate co-docecenylsuccinate co-trimellitate) resin] and [poly(co-propoxylated bisphenol A co-ethoxylated bisphenol A co-terephthalate co-fumarate co-dodecenulsuccinate) resin].

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

The amorphous resin may possess various glass transition temperatures (Tg) of, for example, from about 40° C. to about 100° C., in embodiments from about 45° C. to about 70° C., in some embodiments from 50° C. to about 65° C.

In embodiments, a combination of low weight average molecular weight (Mw) amorphous resin(s) and high weight average molecular weight Mw amorphous resins may be used to form a toner. Low-Mw resin(s) may have a weight-average molecular weight of approximately 10 kg/mol to approximately 20 kg/mol, and a number-average molecular weight of approximately 2 kg/mol to approximately 5 kg/mol. High-Mw resin(s) may have a weight-average molecular weight of approximately 90 kg/mol to approximately 160 kg/mol, and a number-average molecular weight of approximately 4 kg/mol to approximately 8 kg/mol. The ratio, by weight, of low Mw to high Mw amorphous resins may be from about 0:100 to about 100:0, in embodiments from about 70:30 to about 30:70, and in some embodiments from about 60:40 to about 40:60.

In further embodiments, the combined amorphous resins may have a melt viscosity of from about 10 to about 1,000,000 Pa*S at about 130° C., in embodiments, from about 50 to about 100,000 Pa*S.

The total amorphous polyester resin may be presented in an amount of from about 20 weight percent to 60 weight percent by weight of the toner. The high Mw amorphous resin may be presented in an amount of from about 20 weight percent to 50 weight percent by weight of the toner. The low Mw amorphous resin may be presented in an amount of from about 10 weight percent to 50 weight percent by weight of the toner. The amorphous polyester resin may have an average weight molecular weight of from about 8,000 to about 300,000, from about 10,000 to about 200,000, and from about 15,000 to about 150,000.

The toner composition of the present embodiments may or may not contain a cross-linked resin.

Catalyst

Polycondensation catalysts which may be utilized in forming either the crystalline or amorphous polyesters include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole % to about 5 mole %, based on the starting diacid or diester used to generate the polyester resin.

Crosslinking Resin

Linear or branched unsaturated polyesters may be converted into a highly crosslinked polyester by reactive extrusion. Linear or branched unsaturated polyesters may include both saturated and unsaturated diacids (or anhydrides) and dihydric alcohols (glycols or diols). The resulting unsaturated polyesters mayor be reactive (for example, crosslinkable) on two fronts: (i) unsaturation sites (double bonds) along the polyester chain, and (ii) functional groups, such as, carboxyl, hydroxy and similar groups amenable to acid-base reaction. Unsaturated polyester resins may be prepared by melt polycondensation or other polymerization processes using diacids and/or anhydrides and diols. Illustrative examples of unsaturated polyesters may include any of various polyesters, such as SPAR™ (Dixie Chemicals), BECKOSOL™ (Reichhold Inc), ARAKOTE™ (Ciba-Geigy Corporation), HETRON™ (Ashland Chemical), PARAPLEX™ (Rohm & Hass), POLYLITE™ (Reichhold Inc), PLASTHALL™ (Rohm & Hass), CYGAL™ (American Cyanamide), ARMCO™. (Armco Composites), ARPOL™ (Ashland Chemical), CELANEX™ (Celanese Eng), RYNITE™ (DuPont), STYPOL™. (Freeman Chemical Corporation), a linear unsaturated poly(propoxylated bisphenol A co-fumarate) polyester, XP777 (Reichhold Inc.), or mixtures thereof and the like. The resins may also be functionalized, such as, carboxylated, sulfonated or the like, such as, sodio sulfonated.

The crosslinked resin may be prepared by (1) melting the linear or branched unsaturated polyester in a melt mixing device; (2) initiating cross-linking of the polymer melt, preferably with a chemical crosslinking initiator and increasing reaction temperature; (3) keeping the polymer melt in the melt mixing device for a sufficient residence time that partial cross-linking of the linear or branched resin may be achieved; (4) providing sufficiently high shear during the cross-linking reaction to keep the gel particles formed and broken down during shearing and mixing and well distributed in the polymer melt; (5) optionally devolatizing the polymer melt to remove any effluent volatiles; and (6) optionally adding additional linear or branched resin after the crosslinking in order to achieve the desired level of gel content in the end resin. As used herein, the term "gel" refers to the crosslinked domains within the polymer. Chemical initiators such as, for example, organic peroxides or azo-compounds may be used for making the crosslinked resin for the invention. In one embodiment, the initiator is 1,1-di(t-butyl peroxy)-3,3,5-trimethylcyclohexane.

In one embodiment, the highly crosslinked resin is prepared from an unsaturated poly(propoxylated bisphenol A co-fumarate) polyester resin.

Colorants

The colorant may be selected, for example, from cyan, magenta, yellow, or black pigment dispersions of each color in an anionic surfactant, or optionally in a non-ionic surfactant to provide, for example, pigment particles having a volume average particle diameter of, for example, from about 50 nanometers to about 300 nanometers, or from about 125 nanometers to about 200 nanometers. The surfactant used to disperse each colorant can be any number of known components such as, for example, an anionic surfactant like NEOGEN RK™. Ultimizer equipment can be used to provide the colorant dispersions, although media mills or other known processes may be utilized to generate the wax dispersions.

As examples of suitable colorants, mention may be made of carbon black like REGAL330™; magnetites, such as, Mobay magnetites MO8029™ and MO8060™; Columbian magnetites; MAPICO BLACKS™, surface-treated magnetites; Pfizer magnetites CB4799™, CB5300™, CB5600™ and MCX6369™; Bayer magnetites, BAYFERROX 8600™ and 8610™; Northern Pigments magnetites, NP-604™ and NP-608™; Magnox magnetites TMB-100™ or TMB-104™; and the like. Colored pigments, may be cyan, magenta, yellow, red, green, brown, blue pigment or mixtures thereof. Generally, cyan, magenta or yellow pigments or dyes, or mixtures thereof, are used. The pigment or pigments may be water-based pigment dispersions.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™ PIGMENT BLUE 1™ available from Paul Uhlich & Company, Inc., PIGMENT VIOLET 1™, PIGMENT RED48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, CINQUASIA MAGENTA™ available from E.I. DuPont de Nemours & Company and the like. Colorants that may be selected include black, cyan, magenta, yellow or mixtures thereof. Non-limiting examples of magentas include 2,9-dimethyl-substituted quinacridone and anthraquinone dye identified in the Color Index as CI 60710, CI Dispersed Red 15, diazo dye identified in the Color Index as CI 26050, CI Solvent Red 19 and the like. Non-limiting examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Non-limiting examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide and Permanent Yellow FGL. Colored magnetites, such as, mixtures of MAPICO BLACK™ and cyan components also may be selected as colorants. Other known colorants may be selected, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), any combinations of the foregoing and the like.

In embodiments, fluorescent Yellow, fluorescent white, fluorescent pink, fluorescent blue, fluorescent orange particles can be incorporated in the core of the toner particles. Examples of fluorescent colorants include Fluorescent FB184, Dye include SR49, D838. In embodiments, the colorant can include metallic particles with a particle size range of from 50 nanometers (nms) to 30 microns (μms). The metallic particle can further contain a colorant, i.e., a color pigment or dye. The metallic particle may be aluminum, copper, zinc, silver, or gold.

Wax

In addition to the polymer resin, the toners of the present disclosure also may contain a wax, which may be either a single type of wax or a mixture of two or more different waxes. A single wax may be added to toner formulations, for example, to improve particular toner properties, such as, toner particle shape, presence and amount of wax on the toner particle surface. Alternatively, a combination of waxes may be added to provide multiple properties to the toner composition. In embodiments, no wax is included in the toner composition of the present disclosure.

When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, in embodiments from about 1,000 to about 10,000. Waxes that may be used include, for example, polyolefins, such as, polyethylene, polypropylene and polybutene waxes, such as, commercially available from Allied Chemical and Petroleum Corporation, for example POLYWAX™ polyethylene waxes from Baker Petrolite, wax emulsions available from Michaelman, Inc. and the Daniels Products Company, EPOLENE-N-15™ commercially available from Eastman Chemical Products, Inc., and VISCOL 550P™ a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax (e.g., FNP-0090, from Nippon Seriro Co. Ltd.), microcrystalline wax and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate, pentaerythritol tetra behenate; ester waxes obtained from higher fatty acid and multivalent alcohol multimers, such as, diethyleneglycol monostearate, di propyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™ and SUPERSLIP 6530™ available from Micro Powder Inc., fluorinated waxes, for example, POLYFLUO 190™, POLYFLUO 200.™. POLYSILK 19™ and POLYSILK 14™ available from Micro Powder Inc., mixed fluorinated, amide waxes, for example, MICROSPERSION 19™ available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes also may be used in embodiments. Waxes may be included as, for example, fuser roll release agents.

Surface Additives

The toner composition of the present embodiments may include one or more surface additives. The surface additives may be coated onto the surface of the toner particles, which may provide a total surface area coverage of from about 50% to about 99%, from about 60% to about 90%, or from about 70% to about 80% of the total surface area of the toner particle. The toner composition may include from about 2.7% to about 4.0%, from about 3.0% to about 3.7%, or from about 3.1% to about 3.5% of surface additive based on the total weight on the toner. The surface additives may further include silica, titania or stearates.

Thereafter, the surface additive mixture and other additives may be added by the blending thereof with the toner obtained.

Surfactants

The toner composition of the present embodiments may include one or more surfactants. Examples of surfactants include, anionic surfactants, such as, diphenyl oxide disulfonate, ammonium lauryl sulfate, sodium dodecyl benzene sulfonate, dodecyl benzene sulfonic acid, sodium alkyl naphthalene sulfonate, sodium dialkyl sulfosuccinate, sodium alkyl diphenyl ether disulfonate, potassium salt of alkylphosphate, sodium polyoxyethylene lauryl ether sulfate, sodium polyoxyethylene alkyl ether sulfate, sodium polyoxyethylene alkyl ether sulfate, triethanolamine polyoxyethylene alkylether sulfate, sodium naphthalene sulfate, and sodium naphthalene sulfonate formaldehyde condensate, and mixtures thereof; and nonionic surfactants, such as, polyvinyl alcohol, methyl cellulose, ethyl cellulose, propyl cellulose, hydroxy ethyl cellulose, carboxy methylcellulose, polyoxyethylene cetyl ether, polyoxyethylene lauryl ether, polyoxyethylene octyl ether, polyoxyethylene nonylphenyl ether, polyoxyethylene oleyl ether, polyoxyethylene sorbitan monolaurate, polyoxyethylene stearyl ether, dialkylphenoxy poly(ethyleneoxy)ethanol, or mixtures thereof.

Toner Preparation

The toner particles may be made by any known emulsion/aggregation process. Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797.

Toner compositions and toner particles of the present disclosure may be prepared by aggregation and coalescence processes in which smaller-sized resin particles are aggregated to the appropriate toner particle size and then coalesced to achieve the final toner particle shape and morphology.

The process of preparing EA particles may involve generating a latex emulsion including the resins described herein and a colorant or pigment, optionally with surfactants, optionally with wax and optionally with surface additives. The latex emulsion may be prepared by the known phase inversion process, such as by mixing the colorant or pigment, the amorphous polyester resin, and the crystalline polyester resin in a suitable solvent, followed by the addition of an aqueous media. Suitable aqueous media used for preparing core particles includes water (e.g., deionized water). Other solvents which can be mixed with water may also be added to water. The aqueous media may include a stabilizer, and optionally a surfactant. In embodiments, the colorant or pigment may be dispersed in an aqueous media to form a dispersion, prior to mixing with the amorphous polyester resin, and the crystalline polyester resin. The colorant or pigment dispersion may further include a surfactant. The surfactant to colorant ratio in the colorant or pigment dispersion may be from 0.5:100 to 8:100, from 1:100 to 5:100, or from 2:100 to 4:100. The resin dispersion may be prepared by dissolving the amorphous polyester resin and the crystalline polyester resin in a suitable solvent, e.g., an organic solvent. The colorant or pigment dispersion may be mixed with the resin dispersion to form a latex emulsion.

The pH of the latex emulsion may be adjusted by an acid (i.e., a pH adjustor) such as, for example, acetic acid, nitric acid or the like. In embodiments, the pH of the latex emulsion may be adjusted to from about 2 to about 4.5. Additionally, in embodiments, the mixture may be homogenized. If the latex emulsion is homogenized, homogenization may be accomplished by mixing at about 600 to about 4,000 revolutions per minute (rpm). Homogenization may be accomplished by any suitable means, including, for example, with an IKA ULTRA TURRAX T50 probe homogenizer or a Gaulin 15MR homgenizer.

Following preparation of the above latex emulsion, generally, an aggregating agent may be added to the latex emulsion. Examples of suitable aggregating agents include polyaluminum halides such as polyaluminum chloride (PAC), or the corresponding bromide, fluoride, or iodide, polyaluminum silicates such as polyaluminum sulfo silicate (PASS), or water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, or any combinations thereof, and the like. In embodiments, suitable aggregating agents include a polymetal salt such as, for example, polyaluminum chloride (PAC), polyaluminum bromide, or polyaluminum sulfosilicate.

The aggregating agent may be added to the latex emulsion to form a toner in an amount of, for example, from about 0.1 parts per hundred (pph) to about 1 pph of the toner particles, in embodiments, from about 0.25 pph to about 0.75 pph of the toner particles. In embodiments, the aggregating agent is present in the toner composition in an amount of from about 0.1 to about 1.0 percent, or of from about 0.2 to about 0.8 percent, or of from about 0.25 to about 0.5 percent by weight of the total weight of the toner particles.

To control aggregation and coalescence of the particles, in embodiments, the aggregating agent may be metered into the latex emulsion over time. For example, the agent may be metered into the latex emulsion over a period of from about 5 to about 240 min, in embodiments, from about 30 to about 200 min. Addition of the agent may also be done while the latex emulsion is maintained under stirred conditions, in embodiments from about 50 rpm to about 1,000 rpm, in embodiments, from about 100 rpm to about 500 rpm, and at a temperature that is below the Tg of the resin.

The particles may be permitted to aggregate until a predetermined desired particle size is obtained. A predetermined desired size refers to the desired particle size as determined prior to formation, with particle size monitored during the growth process as known in the art until such particle size is achieved. Samples may be taken during the growth process and analyzed, for example with a Coulter Counter, for average particle size. The aggregation thus may proceed by maintaining the elevated temperature, or slowly raising the temperature to, for example, from about 40° C. to about 65° C., and holding the latex emulsion at that temperature for a time from about 0.5 hour to about 6 hour, in embodiments, from about 1 hour to about 5 hour, while maintaining stirring, to provide the aggregated particles. Once the predetermined desired particle size is obtained, the growth process is halted.

Shell Formation

A shell of any suitable or desired composition, including any suitable or desired resin or combination of resins including those described herein may be selected. In embodiments, a shell of an amorphous polyester resin and an optional wax resin may be applied to the aggregated toner particles obtained in the form of a core by any desired or effective method. For example, the shell resin may be in the form of an emulsion that includes the disclosed amorphous polyester or combination of amorphous polyesters, wax, and a surfactant. The formed aggregated particles may be combined with the shell resin emulsion so that the shell resin forms a shell over from 80 to 100 percent of the formed aggregates.

Coalescence may proceed over a period of from about 0.1 to about 9 hour, in embodiments, from about 0.5 to about 4 hour.

In continuous process, the coalescence temperature range may be from about 70° C. to about 120° C., in embodiments from about 80° C. to about 110° C., in embodiments from about 90° C. to about 105° C. and coalescence time may be from about 10 seconds to 10 minutes, including from about 10 seconds to about 10 minutes, or from about 15 seconds to 5 minutes or from about 30 seconds to 2 minutes.

After coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

In embodiments, the toner comprises a core and a shell disposed thereover, wherein the core comprises the crystalline resin, amorphous resin, colorant and wax and wherein the shell comprises the amorphous resin. In embodiments, a toner herein comprises a core and a shell disposed thereover, wherein the core comprises the crystalline resin, the first and second amorphous polyester resin as described herein, colorant, and wax, and wherein the shell comprises at least one of the first amorphous polyester, the second amorphous polyester, or a combination of both the first amorphous polyester and the second amorphous polyester. In embodiments, the shell may be an aliphatic polyester, that is, a biodegradable polyester which is skin friendly. The size of the toner particles disclosed herein is from 4.0 μm to 30 μm.

Alcohol-Free Medium

The toner particles may be mixed in any alcohol-free gel type medium and with a high quality of texture and smoothness, long lasting, smug proof, and washes off with soap and water. The toner particles may be mixed with the alcohol free medium such as gel, aloe gel, aloe cream or glycerin. The alcohol-free medium may include any gel or cream that is FDA approved. The alcohol-free medium may encapsulate the toner particles within the body paint. The amount of the alcohol free medium in the body paint ranges from 50 weight percent to about 80 weight percent of the total weight of the body paint.

The toner particle combined with any alcohol-free gel type medium may be combined with a desired mixture ratios of 10 weight % alcohol-free medium: 80 weight % toner particle. In embodiments, the weight ratio of alcohol-free medium to toner particle may be 50:50, or in embodiments 80 weight % alcohol-free medium: 10 weight % toner particles. In addition, water can be added as well as change in ratios to the mixture to provide a consistency to use in an airbrush or use with no water added for a smooth application with any brush or hand applications.

By changing the ratio of toner particles to alcohol free medium, the body paint can also be applied using an airbrush, sponge, or brush, and the like. Because of the small particle size of the body paint, using an air brush will allow for a very fine stream of body paint due to the small particle size of our particles and may be applied anywhere on the body using the air brush or sponge, or brush.

Another advantage is that no alcohol is used in the body paint described herein.

In terms of safety, the user of the body paint described herein, needs to be aware of any allergies before putting anything on their body. The body paint described herein uses a gel medium, lotion or oil, the toner particles are within the gel allowing for less overall contact with the skin.

Another advantage is that the body paint does not need to be activated with water as many other body paints on the market require. Traditional body paint is water based-activated with water and applied in a stippling motion with a sponge to ensure coverage. The body paint of the present disclosure may be applied smoothly with either fingers, brush, or air brush application provide high quality in terms of color due to the fine particles used as the colorant.

EXAMPLES

The body paint was demonstrated with EA black particle as described above, the body paint went on the skin very easily, painted with a fine stream, incredibly smooth, great coverage. After application, and when gel dried there was no cracking, and the body paint moved with the skin. When rubbed, the body paint did not rub off even after several hours. The body paint was washed off with soap and water with no residual body paint left on the skin.

Incorporating a fluorescent aspect makes the body paint disclosed herein more desirable from the artist community as well as film productions, makeup artist for live stage plays, and marketing adds. There are not good or smooth applications without clumping for use with fluorescent body paints. The body paint disclosed herein applies very smoothly and can be overlaid with multiple colors without smudging.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A washable non-toxic body paint comprising:
a body paint including core/shell toner particles and an alcohol free medium;
wherein the core/shell toner particles having a size of from 4.0 µm to 30 µm,
wherein the core comprises a colorant, a crystalline polyester resin, and an amorphous polyester resin,
wherein the crystalline polyester resin is present in an amount of between about 1 weight percent to about 25 weight percent of the total weight of the toner particles, and the amorphous polyester resin is present in an amount of between about 20 weight percent to about 60 weight percent by total weight of the toner particles,
wherein the amorphous polyester resin has an average weight molecular weight of from about 8,000 to about 300,000, and the amorphous polyester resin comprises of a combination of low weight average molecular weight amorphous polyester resin and high weight average molecular weight amorphous polyester resin,
wherein the low weight average molecular weight amorphous polyester resin is present in an amount of from about 10 weight percent to about 50 weight percent by weight of the toner, and the high weight average molecular weight amorphous polyester resin is present in an amount of from about 20 weight percent to about 50 weight percent by weight of the toner,
wherein the shell comprises a polyester resin and,
wherein the alcohol free medium is FDA approved and encapsulates the toner particles within the body paint.

2. The washable non-toxic body paint of claim 1, wherein the alcohol free medium comprises from 50 weight percent to 80 weight percent of the body paint.

3. The washable non-toxic body paint of claim 1, further comprising a wax.

4. The washable non-toxic body paint of claim 1, wherein the colorant comprises particles of magenta pigment, yellow pigment, cyan pigment or black pigment.

5. The washable non-toxic body paint of claim 1, wherein the colorant comprises particles of fluorescent yellow, fluorescent white, fluorescent pink, fluorescent blue and, fluorescent orange.

6. The washable non-toxic body paint of claim 1, wherein the colorant comprises a metallic particle having a particle size range of from 50 nms to 30 µms.

7. The washable non-toxic body paint of claim 6, wherein the metallic particle comprises a metal pigment selected from a group consisting of aluminum, copper, zinc, silver, and gold.

8. The washable non-toxic body paint of claim 1, wherein the alcohol-free medium comprises gel, aloe gel, aloe cream or glycerin.

9. A method for applying a washable non-toxic body paint comprising:
providing the washable non-toxic body paint of core/shell toner particles having a size of from 4.0 µm to 30 µm, wherein the core comprises a colorant, a crystalline polyester resin, and an amorphous polyester resin, the shell comprises a polyester resin; and an alcohol free medium that is FDA approved and encapsulates the toner particles within the body paint,
wherein the crystalline polyester resin is present in an amount of between about 1 weight percent to about 25 weight percent of the total weight of the toner particles, and the amorphous polyester resin is present in an amount of between about 20 weight percent to about 60 weight percent by total weight of the toner particles,
wherein the amorphous polyester resin has an average weight molecular weight of from about 8,000 to about 300,000, and the amorphous polyester resin comprises of a combination of low weight average molecular weight amorphous polyester resin and high weight average molecular weight amorphous polyester resin,
wherein the low weight average molecular weight amorphous polyester resin is present in an amount of from about 10 weight percent to about 50 weight percent by weight of the toner, and the high weight average molecular weight amorphous polyester resin is present in an amount of from about 20 weight percent to about 50 weight percent by weight of the toner; and
applying the body paint on a surface of the skin.

10. The method of claim 9, wherein the alcohol free medium comprises from 50 weight percent to 80 weight percent of the body paint.

11. The method of claim 9, wherein the body paint of further comprises a wax.

12. The method of claim 9, wherein the colorant comprises particles of magenta pigment, yellow pigment, cyan pigment or black pigment.

13. The method of claim 12, wherein the pigment particles have a volume average particle diameter of from about 50 nanometers to about 300 nanometers.

14. The method of claim 9, wherein the colorant comprises particles of fluorescent yellow, fluorescent white, fluorescent pink, fluorescent blue and, fluorescent orange.

15. The method of claim 9, wherein the colorant comprises a metallic particle having a size range of from 50 nms to 30 µms.

16. The method of claim 15, wherein the metallic particle comprises a metal pigment selected from a group consisting of aluminum, copper, zinc, silver, and gold.

17. The method of claim 9, wherein alcohol-free medium comprises gel, aloe gel, aloe cream or glycerin.

18. A washable non-toxic body paint comprising:
a body paint including core/shell toner particles and an alcohol free medium;
wherein the core/shell toner particles having a size of from 4.0 µm to 30 µm, wherein the core comprises a colorant, a crystalline polyester resin, and an amorphous polyester resin,
wherein the crystalline polyester resin is present in an amount of between about 1 weight percent to about 25 weight percent of the total weight of the toner particles, and the amorphous polyester resin is present in an amount of between about 20 weight percent to about 60 weight percent by total weight of the toner particles,
wherein the amorphous polyester resin has an average weight molecular weight of from about 8,000 to about 300,000, and the amorphous polyester resin comprises of a combination of low weight average molecular weight amorphous polyester resin and high weight average molecular weight amorphous polyester resin,
wherein the low weight average molecular weight amorphous polyester resin is present in an amount of from about 10 weight percent to about 50 weight percent by weight of the toner, and the high weight average molecular weight amorphous polyester resin is present in an amount of from about 20 weight percent to about 50 weight percent by weight of the toner, wherein the shell comprises a polyester resin; and wherein the alcohol free medium is FDA approved and encapsulates the toner particles within the body paint, and wherein a weight percent of the alcohol-free medium is from 10 to 80 of the body paint.

19. The washable non-toxic body paint of claim 18, wherein the alcohol-free medium comprises gel, aloe gel, aloe cream or glycerin.

20. The washable non-toxic body paint of claim 18, wherein the colorant comprises particles of magenta pigment, yellow pigment, black pigment fluorescent yellow, fluorescent white, fluorescent pink, fluorescent blue or fluorescent orange.

* * * * *